(12) United States Patent
Williams

(10) Patent No.: US 11,948,542 B2
(45) Date of Patent: Apr. 2, 2024

(54) SYSTEMS, DEVICES, AND METHODS FOR COMPUTER-GENERATED MUSICAL NOTE SEQUENCES

(71) Applicant: Obeebo Labs Ltd., Waterloo (CA)

(72) Inventor: Colin P. Williams, Half Moon Bay, CA (US)

(73) Assignee: Obeebo Labs Ltd., Waterloo (CA)

( * ) Notice: Subject to any disclaimer, the term of this patent is extended or adjusted under 35 U.S.C. 154(b) by 576 days.

(21) Appl. No.: 17/163,214

(22) Filed: Jan. 29, 2021

(65) Prior Publication Data

US 2021/0241734 A1 Aug. 5, 2021

Related U.S. Application Data

(60) Provisional application No. 62/968,963, filed on Jan. 31, 2020.

(51) Int. Cl.
*G10H 1/00* (2006.01)
*G06F 16/65* (2019.01)
(Continued)

(52) U.S. Cl.
CPC .......... *G10H 1/0025* (2013.01); *G06F 16/65* (2019.01); *G06Q 40/12* (2013.12); *G06Q 50/184* (2013.01);
(Continued)

(58) Field of Classification Search
CPC .. G10H 1/0025; G10H 1/0008; G10H 1/0041; G10H 7/08; G10H 2210/031; G10H 2210/056; G10H 2210/061; G10H 2210/071; G10H 2210/111; G10H 2210/131; G10H 2210/145; G10H 2250/005; G10H 2250/215; G06Q 40/12; G06Q 50/184; G06F 16/65
(Continued)

(56) References Cited

U.S. PATENT DOCUMENTS

| 7,705,231 | B2 * | 4/2010 | Morris | G10H 1/36 84/613 |
| 2010/0192755 | A1 * | 8/2010 | Morris | G10H 1/0025 84/637 |

(Continued)

FOREIGN PATENT DOCUMENTS

| CN | 102521281 A | * | 6/2012 |
| CN | 109448683 A | * | 3/2019 |

(Continued)

*Primary Examiner* — Christina M Schreiber
(74) *Attorney, Agent, or Firm* — Thomas Mahon

(57) ABSTRACT

Computer-based systems, devices, and methods for generating musical note sequences are described. One or more musical composition(s) stored in digital media include one or more data object(s) that encode notes and/or note sequences. At least one note sequence is processed to form a time-ordered sequence of parallel notes, which is analyzed to determine a k-back probability transition matrix for the at least one note sequence. An attribute, such as a style, of the at least one note sequence is thus encoded and used to generate new note sequences that embody a similar attribute or style. In some implementations, the at least one note sequence may include a concatenated set of note sequences representative of a particular library of musical compositions.

19 Claims, 6 Drawing Sheets

(51) Int. Cl.
*G06Q 40/12* (2023.01)
*G06Q 50/18* (2012.01)
*G10H 7/08* (2006.01)

(52) U.S. Cl.
CPC ......... *G10H 1/0008* (2013.01); *G10H 1/0041* (2013.01); *G10H 7/08* (2013.01); *G10H 2210/031* (2013.01); *G10H 2210/056* (2013.01); *G10H 2210/061* (2013.01); *G10H 2210/071* (2013.01); *G10H 2210/111* (2013.01); *G10H 2210/131* (2013.01); *G10H 2210/145* (2013.01); *G10H 2250/005* (2013.01); *G10H 2250/215* (2013.01)

(58) Field of Classification Search
USPC .......................................................... 84/609
See application file for complete search history.

(56) References Cited

U.S. PATENT DOCUMENTS

| | | | | |
|---|---|---|---|---|
| 2012/0246209 | A1* | 9/2012 | Pachet | G06F 17/10 |
| | | | | 708/200 |
| 2013/0192445 | A1* | 8/2013 | Sumi | G10H 1/0008 |
| | | | | 84/609 |
| 2013/0276619 | A1* | 10/2013 | Fujita | G10H 7/00 |
| | | | | 84/609 |
| 2014/0174279 | A1* | 6/2014 | Wong | G10H 1/0025 |
| | | | | 84/609 |
| 2016/0300555 | A1* | 10/2016 | Begelfor | G06V 30/304 |
| 2018/0018949 | A1* | 1/2018 | Sullivan | G10H 1/366 |
| 2018/0061382 | A1* | 3/2018 | Summers | G10H 1/0008 |
| 2021/0241734 | A1* | 8/2021 | Williams | G06F 16/65 |
| 2022/0114994 | A1* | 4/2022 | Williams | G06N 10/20 |

FOREIGN PATENT DOCUMENTS

| | | | | | |
|---|---|---|---|---|---|
| CN | 110264984 | A | * | 9/2019 | ............. G06N 3/084 |
| CN | 111630573 | A | * | 9/2020 | ........... G06N 3/0445 |
| CN | 111680187 | A | * | 9/2020 | |
| CN | 112885315 | A | * | 6/2021 | ........... G06N 3/0454 |
| CN | 114202763 | A | * | 3/2022 | |
| CN | 115206270 | A | * | 10/2022 | |
| WO | WO-2005010642 | A2 | * | 2/2005 | ............. G06F 17/27 |
| WO | WO-2010045665 | A1 | * | 4/2010 | ........... G10H 1/0066 |

\* cited by examiner

SYSTEMS, DEVICES, AND METHODS FOR COMPUTER-GENERATED MUSICAL NOTE SEQUENCES

CROSS-REFERENCE TO RELATED APPLICATION

This application claims the benefit of U.S. Provisional Patent Application Ser. No. 62/968,963, filed Jan. 31, 2020, titled "Systems, Devices, And Methods for Computer-Generated Musical Compositions", the content of which is incorporated herein in its entirety by reference.

TECHNICAL FIELD

The present systems, devices, and methods generally relate to computer-generated music, and particularly relate to generating new note sequences based on analyzing existing musical compositions.

BACKGROUND

Description of the Related Art

Composing Musical Compositions

A musical composition may be characterized by sequences of sequential, simultaneous, and/or overlapping notes (or "note sequences") that are partitioned into one or more tracks. Starting with an original musical composition, a new musical composition or "variation" can be composed by manipulating the "elements" (e.g., notes, bars, tracks, arrangement, etc.) of the original composition. That is, starting with an original note sequence, a new note sequence or variation can be defined for which, as examples, different notes may be played at the original times, the original notes may be played at different times, and/or different notes may be played at different times. Further refinements can be made based on many other factors, such as changes in musical key and scale, different choices of chords, different choices of instruments, different orchestration, changes in tempo, the imposition of various audio effects, changes to the sound levels in the mix, and so on.

In order to compose a new musical composition (or variation) based on an original or previous musical composition, it is typically helpful to have a clear characterization of the elements of the original musical composition. In addition to notes, bars, tracks, and arrangements, "segments" are also important elements of a musical composition. In this context, the term "segment" (or "musical segment") is used to refer to a particular sequence of bars (i.e., a subset of serially-adjacent bars) that represents or corresponds to a particular section or portion of a musical composition. A musical segment may include, for example, an intro, a verse, a pre-chorus, a chorus, a bridge, a middle8, a solo, or an outro. The section or portion of a musical composition that corresponds to a "segment" may be defined, for example, by strict rules of musical theory and/or based on the sound or theme of the musical composition.

BRIEF SUMMARY

A computer-implemented method of generating a musical note sequence may be summarized as including: determining a first time-ordered sequence of parallel notes for a first musical note sequence; determining a k-back probability transition matrix based at least in part on the first time-ordered sequence of parallel notes; and generating a music sample from the k-back probability transition matrix. Generating a music sample from the k-back probability transition matrix may include generating a second time-ordered sequence of parallel notes based at least in part on the first time-ordered sequence of parallel notes. Generating a music sample from the k-back probability transition matrix may further include converting the second time-ordered sequence of parallel notes into a second musical note sequence. Converting the second time-ordered sequence of parallel notes into a second musical note sequence may include applying note parameters to each respective note in the second time-ordered sequence of parallel notes, the note parameters selected from a group consisting of: note parameters copied from the first musical note sequence, note parameters copied from a third musical note sequence, and newly generated note parameters.

The method may further include encoding a new musical note sequence that includes the music sample. Encoding a new musical note sequence that includes the music sample may include encoding a variation of the first musical note sequence with the music sample in place of the first musical note sequence.

Determining a first time-ordered sequence of parallel notes for a first musical note sequence may include: grouping all notes in the first musical note sequence into sets, wherein each set is characterized by a respective note start time; sorting all sets by note start time; and sorting all notes within each set by note pitch. The method may further include: determining an interval representation of the first time-ordered sequence of parallel notes, and determining an interval representation of the first time-ordered sequence of parallel notes may include: for each set: determining a lowest-pitch note in the set; and determining a respective internal interval between each respective pair of adjacent notes in the set. Determining a k-back probability transition matrix based at least in part on the first time-ordered sequence of parallel notes may include determining a k-back probability transition matrix based at least in part on the interval representation of the first time-ordered sequence of parallel notes. The method may further include: determining a respective external interval between each respective pair of lowest-pitch notes in adjacent sets; and determining a riffled interval representation of the first time-ordered sequence of parallel notes that, for each set, alternates between representing all internal intervals within the set and representing an external interval between the set and a next adjacent set. Determining a k-back probability transition matrix based at least in part on the interval representation of the first time-ordered sequence of parallel notes may include determining a k-back probability transition matrix based at least in part on the riffled interval representation of the first time-ordered sequence of parallel notes.

In some implementations, $1 \leq k < J$, where J is a smallest integer for which every sequence of k parallel notes in the first time-ordered sequence of parallel notes is unique.

The method may further include establishing a one-to-one correspondence between notes in the first musical note sequence and notes in the music sample generated from the k-back probability transition matrix. Determining a k-back probability transition matrix based at least in part on the first time-ordered sequence of parallel notes may include determining a k-back probability transition matrix based at least in part on at least one of: note sequences, note interval sequences, time interval sequences, note start-time sequences, and/or time duration sequences. Determining a k-back probability transition matrix based at least in part on the first time-ordered sequence of parallel notes may include: grouping the first time-ordered sequence of parallel notes into a sequence of tuples each having size k; and determining a probability transition matrix based at least in part on the tuples, wherein a probability of each successor tuple depends on an immediately previous tuple and not on any additional tuple that precedes the immediately previous tuple.

The method may further include: determining a second time-ordered sequence of parallel notes for a second musical note sequence, wherein determining a k-back probability transition matrix based at least in part on the first time-ordered sequence of parallel notes includes determining a k-back probability transition matrix based at least in part on both the first time-ordered sequence of parallel notes and the second time-ordered sequence of parallel notes.

The method may further include: concatenating a set of musical note sequences in series, wherein determining a first time-ordered sequence of parallel notes for a first musical note sequence includes determining the first time-ordered sequence of parallel notes for the concatenated set of musical note sequences. Determining a k-back probability transition matrix based at least in part on the first time-ordered sequence of parallel notes may include, for each pair of successive musical compositions in the concatenated set of musical compositions, characterizing a transition between the pair of successive musical compositions in a prescribed way. The set of musical note sequences may consist of a plurality of musical note sequences each having a common characteristic selected from a group consisting of: originating from a common musical composition, being respective tracks of a common multi-track musical composition, embodying a common genre, embodying a common style, embodying a common mood, featuring a common instrument, originating from a common composer, originating from a common performing artist, originating from a common band, originating from a common album, originating from a common producer, originating from a common studio, and/or functioning in a common musical role.

A system for generating a musical note sequence may be summarized as including: at least one processor; and a non-transitory processor-readable storage medium communicatively coupled to the at least one processor, the non-transitory processor-readable storage medium storing processor-executable instructions and/or data that, when executed by the at least one processor, cause the at least one processor to: determine a first time-ordered sequence of parallel notes for the first musical note sequence; determine a k-back probability transition matrix based at least in part on the first time-ordered sequence of parallel notes; and generate a music sample from the k-back probability transition matrix. The system may further include processor-executable instructions and/or data that, when executed by the at least one processor, cause the at least one processor to encode, in the non-transitory processor readable storage medium, a new musical note sequence that includes the music sample.

A computer program product for generating a musical note sequence may be summarized as including: processor-executable instructions and/or data that, when the computer program product is stored in a non-transitory processor-readable storage medium and executed by at least one processor communicatively coupled to the non-transitory processor-readable storage medium, cause the at least one processor to: determine a first time-ordered sequence of parallel notes for the first musical note sequence; determine a k-back probability transition matrix based at least in part on the first time-ordered sequence of parallel notes; and generate a music sample from the k-back probability transition matrix. The computer program product may further include processor-executable instructions and/or data that, when executed by the at least one processor, cause the at least one processor to encode, in the non-transitory processor readable storage medium, a new musical note sequence that includes the music sample.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
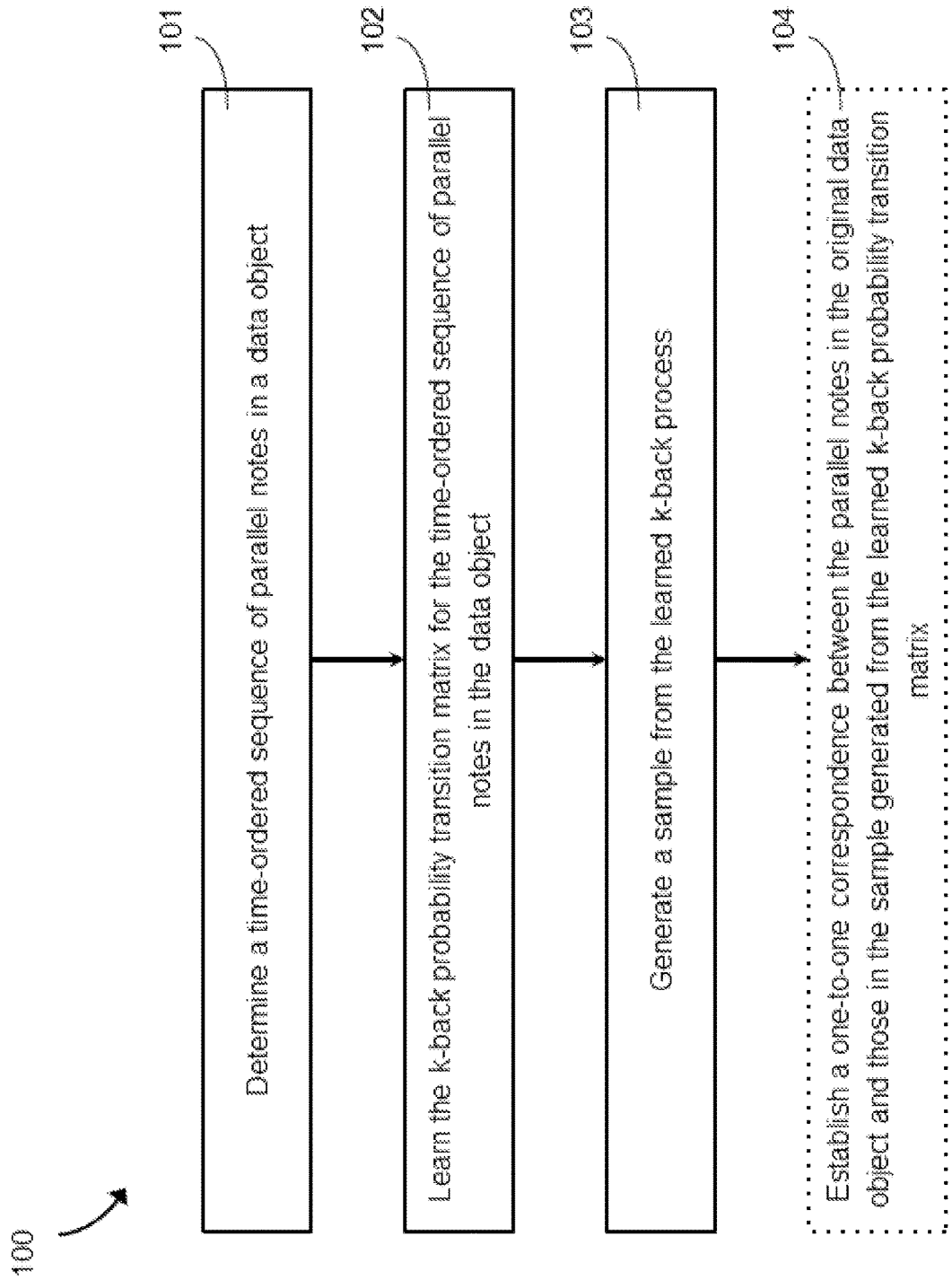
FIG. 1 is a flow diagram showing an exemplary computer-implemented method of varying (e.g., applying a note variation to) a data object in accordance with the present systems, devices, and methods.

The following description sets forth specific details in order to illustrate and provide an understanding of the various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide computer-based systems, devices, and methods for generating one or more musical note sequence(s), including for example one or more variation(s) of at least one musical note sequence. In some implementations, existing note sequences from one or more musical composition(s) are analyzed to determine or "learn" the probabilities of various parallel note transitions. The harmonic structure of the parallel note sequences may also be automatically detected. Information about the probabilities of parallel note transitions and the harmonic structure may then be used to synthesize new parallel note trajectories that are substantially different from those of the original note sequences. In some cases, transition probabilities learned from one musical composition may be used to generate note trajectories within another musical composition.

Systems, devices, and methods for encoding musical compositions in hierarchical data structures of the form Music[Segments{ }, barsPerSegment{ }] are described in U.S. Pat. No. 10,629,176, filed Jun. 21, 2019 and entitled "Systems, Devices, and Methods for Digital Representations of Music," which is incorporated by reference herein in its entirety.

Systems, devices, and methods for automatically identifying the musical segments of a musical composition and which can facilitate encoding musical compositions (or even simply undifferentiated sequences of musical bars) into the Music[Segments{ }, barsPerSegment{ }] form described above are described in U.S. patent application Ser. No. 16/775,241, filed Jan. 28, 2020 and entitled "Systems, Devices, and Methods for Segmenting a Musical Composition into Musical Segments," which is incorporated herein by reference in its entirety.

Systems, devices, and methods for identifying harmonic structure in digital data structures and for mapping the Music[Segments{ }, barsPerSegment{ }] data structure into an isomorphic HarmonicStructure[Segments{ }, harmonicSequencePerSegment{ }] data structure are described in US Patent Publication No. 2020-0402488, filed Jan. 28, 2020 and entitled "Systems, Devices, and Methods for Harmonic Structure in Digital Representations of Music," which is incorporated herein by reference in its entirety.

The various embodiments described herein include systems, devices, and methods for, among other things, using Music[Segments{ }, barsPerSegment{ }] data structures and HarmonicStructure[Segments{ }, harmonicSequencePerSegment{ }] data structures to create, compose, and/or generate variations of the note sequences within the musical bars (i.e., within the bar data objects encoded in the data structures) and thereby generate: i) new musical compositions that are variations on an original musical composition; and/or ii) new musical compositions that are, for all intents and purposes, original musical compositions.

Throughout this specification and the appended claims, reference is often made to a "data object." Unless the specific context requires otherwise, the term "data object" is used herein to refer to a collection or set of data that is combined or amalgamated into a discretely addressable object. A data object may exist in the source code, object code, computer code, and/or program code of a computing environment where it is defined, interpreted, and manipulated, and a data object may have an analog or physical counterpart in the non-transitory processor-readable storage medium where it is stored and called or operated upon. In this case, "encoding" a component of a musical composition in a data object may include writing, by at least one processor, the component to the data object in the non-transitory processor-readable storage medium and/or forming, by at least one processor, the component(s) in the data object stored in the non-transitory processor-readable storage medium. One data object may include (e.g., contain, encompass, reference, or invoke) one or more additional data object(s).

Throughout this specification and the appended claims, unless the specific context requires otherwise the general term "data object" is used to refer to any (either individually or in multiplicity) of the different types of data objects that are used to encode digital music, including but not limited to those that are encoded (or may be encoded) in a Music [Segments{ }, barsPerSegment{ }] data structure and/or in a HarmonicStructure[Segments{ }, harmonicSequencePerSegment{ }] data structure, such as a bar data object, a track data object, a segment data object, and/or a Music[ ] data object. Thus, unless the specific context requires otherwise, reference to a note variation being applied to or within a "data object" is generally applicable to all such data object types. Furthermore, the significance or impact a note variation has on an overall musical composition may depend on the scale of the data object to which it is applied (e.g., a note variation applied in one bar data object may be less significant or impactful than a note variation applied across an entire segment data object).

Throughout this specification and the appended claims, unless the specific context requires otherwise the term "note" is generally used to refer to a musical note (such as Ab, A, A#, Bb, B, C, C#, Db, D, D#, Eb, E, F, F#, Gb, G, G# (of any octave), and theoretical notes such as Cb, which is enharmonic to B) and is inclusive of rests (i.e., a note with a certain timing but no pitch or volume). As described in more detail later on, the term note is also intended to be inclusive of percussion events. A person of skill in the art will appreciate that the "parameters" of a note, or "note parameters," may include any or all concepts used to characterize notes in modern musical theory, including without limitation: pitch, start time, stop time, duration, volume, attack, reverb, decay, sustain, and instrument (e.g., tone, timbre, relative harmonics, and the like). Thus, a "note data object" is a data object that encodes a note, including its applicable note parameters. Furthermore, the term "note sequence" is used to refer to a sequence of musical notes, where each note in the sequence may include any/all of its corresponding note parameters.

FIG. 1 is a flow diagram showing an exemplary computer-implemented method 100 of varying (e.g., applying a note variation to) a data object in accordance with the present systems, devices, and methods. Method 100 generates new note sequences that are based, at least in part, on determining or "learning" the stochastic process(es) underlying the note sequences in the original data object. Method 100 includes three acts 101, 102, and 103, and one optional act 104, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 101, the time-ordered sequence of parallel notes in the data object is determined, e.g., by at least one processor. Determining the time-ordered sequence of parallel notes at 101 may include sorting all notes in the data object by note start time and, for each note start time, sorting all corresponding notes by note pitch. In other words, the notes in the data object may be grouped into those that start substantially simultaneously with one another. The groups themselves may be sorted in increasing order of start time and the notes within each group may be sorted in increasing order of pitch. A convention may be adopted for enharmonic equivalents (e.g., C# and Db), such as "place the sharps before the flats."

At 102, the k-back probability transition matrix is learned (i.e., determined, by at least one processor) for the time-ordered sequence of parallel notes in the data object determined at 101. Learning such a k-back stochastic process on parallel note sequences at 102 allows new note variations that are informed by context (i.e., informed by neighboring notes) to be generated.

At 103, a sample (i.e., at least one sample, in some implementations this may include multiple samples) is generated from the learned k-back process. The sample may have a length equal to the number of parallel notes in the data object. Generating samples at 103 from the process learned at 102 may provide a way of generating new parallel note sequence variations for the data object.

The value of the "look back distance" k may be any integer greater than or equal to 1. If k=1, the probabilities of various successor states may depend only on the previous state per a standard Markov process. However, if k>1 a non-Markovian process may be realized in which state transition probabilities depend on the last k states visited. Although the value of look back, k, may be somewhat arbitrary, in the context of music variation generation it can be advantageous not to choose k to be too large. For example, if k is chosen to be so large that every sequence of length k of parallel notes is unique within the music, then every generalized state will then have a unique successor generalized state and, when a sample is generated from such a process, exactly the original sequence of parallel notes may be recovered. Thus, it can be advantageous in certain implementations of method 100 to make a judicious choice for k. With k>>1, more musical results are obtained but such results may also be closer to the original parallel note sequence, thus limiting the musical interest in the variation.

In some implementations, method 100 may include optional 104, at which a one-to-one correspondence is established between the parallel notes in the original data object (i.e., those characterized at 101) and the notes in the sample generated at 103 from the k-back stochastic process learned at 102.

In a traditional Markov process, the transition probabilities from one state to another depend upon only the last state visited. In a k-back stochastic process, the transition probabilities may depend on the last k states visited. In accordance with the present systems, devices, and methods, a k-back stochastic process may be modeled as a Markov process over a set of "generalized states" (rather than single states). Each of these generalized states may include some k-tuple from the original sequence of states. For example, if the original sequence of states is a pattern of the form {a, a, c, b, e, a, b, b, d, . . . } (i.e., a pattern of musical notes), then the 3-back version is the sequence of "generalized states" {a, a, c}, {a, c, b}, {c, b, e}, {b, e, a}, {e, a, b}, {a, b, b}, {b, b, d}, . . . built from successive 3-tuples offset by 1 step. The transition probabilities may be inferred over these generalized states to build a model that works in the space of these generalized states.

Returning to 102, the transition probability matrix may be learned over generalized states (k-tuples) together with the correspondences between generalized states and k-tuples. Specifically, a method Learn KBackProbabilityTransition-Matrix[k, sequence] may be implemented at 102 to return a probability transition matrix, prTransMatrix, over a set of generalized states, si, (each a k-tuple of regular states), together with the correspondence between each generalized state, si and its k-tuple, i.e., the generalizedStateToKTuple-Correspondences.

In some implementations, method 100 may involve generating a random realization of a k-back process given its transition probability matrix and its generalized state to k-tuple correspondences. For example, given a probability transition matrix over generalized states (prTransMatrix) and the generalized state to k-tuple correspondences (generalizedStateToKTupleCorrespondences), method 100 may employ SampleKBackMarkovProcess[n, prTransMatrix, generalizedStateToKTupleCorrespondences] to return a realization of n steps of a k-back stochastic process over an ordered set of states with transition probabilities specified by prTransMatrix.

In some implementations of method 100 (and particularly, in some implementations of act 102 of method 100), music may be regarded as a non-random sequence of musical notes (symbols) such that the probability of the i-th note being X is dependent on some (or all) of the notes that precede it. In such implementations, the k-back transition matrix determined at 102 may learn and characterize the probability of the i-th note being X given the k previous notes. Once the model is learned at 102 it may be employed at 103 to synthesize new note sequences.

In other implementations of method 100 (and particularly, in other implementations of act 102 of method 100), music may be regarded as a non-random sequence of musical intervals (e.g., integers representing pitch distance, such as measured by the number of half steps, between notes) such that the probability of the i-th interval being X is dependent on some (or all) of the intervals that precede it. In such implementations, the k-back transition matrix determined at 102 may learn and characterize the probability of the i-th interval being X given the k previous intervals. Once the model is learned at 102, and once a starting note is given or selected, the model may be employed to generate new note sequences by interpreting the interval sequence with respect to the starting note. In other words, method 100 may be performed based on analyzing, at 102, interval sequences (i.e., differences between consecutive notes) rather than note sequences.

As previously described, a piece of music may be described as a sequence of "parallel notes", i.e., notes that start substantially simultaneously at the same note start time. The intervals between the notes within each parallel set, and the intervals between the notes between parallel sets may collectively determine the harmonic structure of the music. Thus, in accordance with the present systems, devices, and methods, music may be represented in the form of intervals by, for example, arranging the musical composition into sets of parallel notes and determining: i) the bass (i.e., lowest) note of the first set of parallel notes; ii) the intervals between the notes within each set of parallel notes (i.e., the "internal intervals"); and iii) the intervals between the bass notes (i.e., lowest notes) between consecutive sets of parallel notes (i.e., the "external intervals"). With this information, the musical composition may be represented as a sequence of the form: internalIntervals1, externalInterval12, internalIntervals2, externalIntervals23, . . . , externalInterval(N−1)N, where N is the number of sets of parallel notes (i.e., the number of unique note start times) in the musical composition. This "interval representation" maps the musical composition to a one dimensional sequence of intervals that is riffled, staggered, or alternating between internal intervals and external intervals, which can be advantageous if, in accordance with the present systems, devices, and methods, a k-back probability transition matrix is learned for the sequence of riffled intervals. Such a transition matrix may be used to generate new sequences of riffled intervals that can be initialized with any starting note, which may, in some implementations, provide different and potentially more interesting note variations than a transition matrix based on note sequences alone.

In accordance with the present systems, devices, and methods, note sequences and/or interval sequences that are characteristic of or common to particular musical bands or artists may be learned by performing acts 101 and 102 of method 100 across multiple musical compositions performed by a single band or artist and synthesizing the result into a single transition matrix. Once such a band- or artist-specific transition matrix is learned, it may be deployed at 103 of method 100 to generate samples of new musical variations (or, alternatively, completely new musical compositions) that may embody a style or other musical quality that emulates or otherwise represents the band or artist based on for whose works the transition matrix has been learned. Thus, in some implementations, a band- or artist-specific transition matrix may be learned in accordance with the present systems, devices, and methods and subsequently deployed to generate or compose any number of new compositions in the style of the original band or artist (i.e., not simply variations on existing musical compositions, but rather new musical compositions that are original compositions that deploy the style of the original band or artist). As an extension of this, the works of multiple bands or artists may be combined into a single transition matrix in controllable ways. For example, a transition matrix that is (at least approximately) X % band ABC, Y % band DEF, and Z % artist GHI may be constructed to generate musical samples that may approximate a combination of the styles of bands ABC, DEF and artist GHI.

In accordance with the present systems, devices, and methods, time intervals (i.e., the durations of notes and the time between notes) may be analyzed as well as or instead of note intervals and/or note sequences to construct transition matrices at 102 based on time intervals and to generate variations on time intervals at 103.

Likewise, in accordance with the present systems, devices, and methods, loudness intervals (i.e., the change in loudness between notes) may be analyzed as well as or instead of note intervals and/or note sequences to construct transition matrices at 102 based on loudness intervals and to generate variations on loudness intervals at 103.

The various embodiments described herein include computer-based systems, devices, and methods for learning features of music encoded in a digital representation (e.g., .mid, .wav, .mp3., .mp4a, .hum, and the like) and for using this learned structure to create, compose, or generate new music. The features learned may include, without limitation, any or all of: i) the instrument used per track; ii) the musical role of each track (e.g., melody, harmony, bassline, ornamentation, primary-rhythm, secondary-rhythm, ornamentation-rhythm); iii) the segmentation of the music into a contiguous sequence of abutting musically coherent "segments" (and the bars associated with each of them); and/or iv) the harmonic structure of the music within and across segments (i.e., which bars share common tonality), as well as many other potential features. When assessing harmony, the present systems, devices, and methods may employ multiple sensory modalities (sight, sound, note energy, note sequence, and note count (or energy) distribution).

In some implementations, the computer-based learning processes described above may invoke or call a specific function, such as LearnMusic[digitalFile], which may as its output produce several files within subfolders of the main program folder. LearnMusic[digitalFile] may, for example, construct the following data objects for each digital music file:

LearnedMusic[
    song (this the digital file name on which the training was based),
    music (i.e., the .hum or "Music[Segments{ }, barsPerSegment{ }] data structure),
    instrumentPerTrack,
    rolePerTrack,
    segmentation,
    harmonyByEar,
    harmonyByEye,
    harmonyByNoteCountDistribution,
    harmonyByNoteEnergyDistribution,
    harmonyByNoteSequence]

As described previously, the present systems, devices, and methods may, in some implementations, learn the k-back probability transition matrix between parallel notes for each track of a musical composition. Such probability transition matrices, optionally together with the detected harmonic structure, may be used to synthesize note trajectories that are substantially different from those of the original musical composition. Moreover, probability transition matrices learned from one musical composition may be used to generate note trajectories within another musical composition. That is, in some implementations an underlying model for synthesizing note sequences may be learned or derived from a first musical composition and that same model may subsequently be used to synthesize note sequences in another, different musical composition (e.g., with different timing etc.), and then reharmonize it all together.

Figure 2:
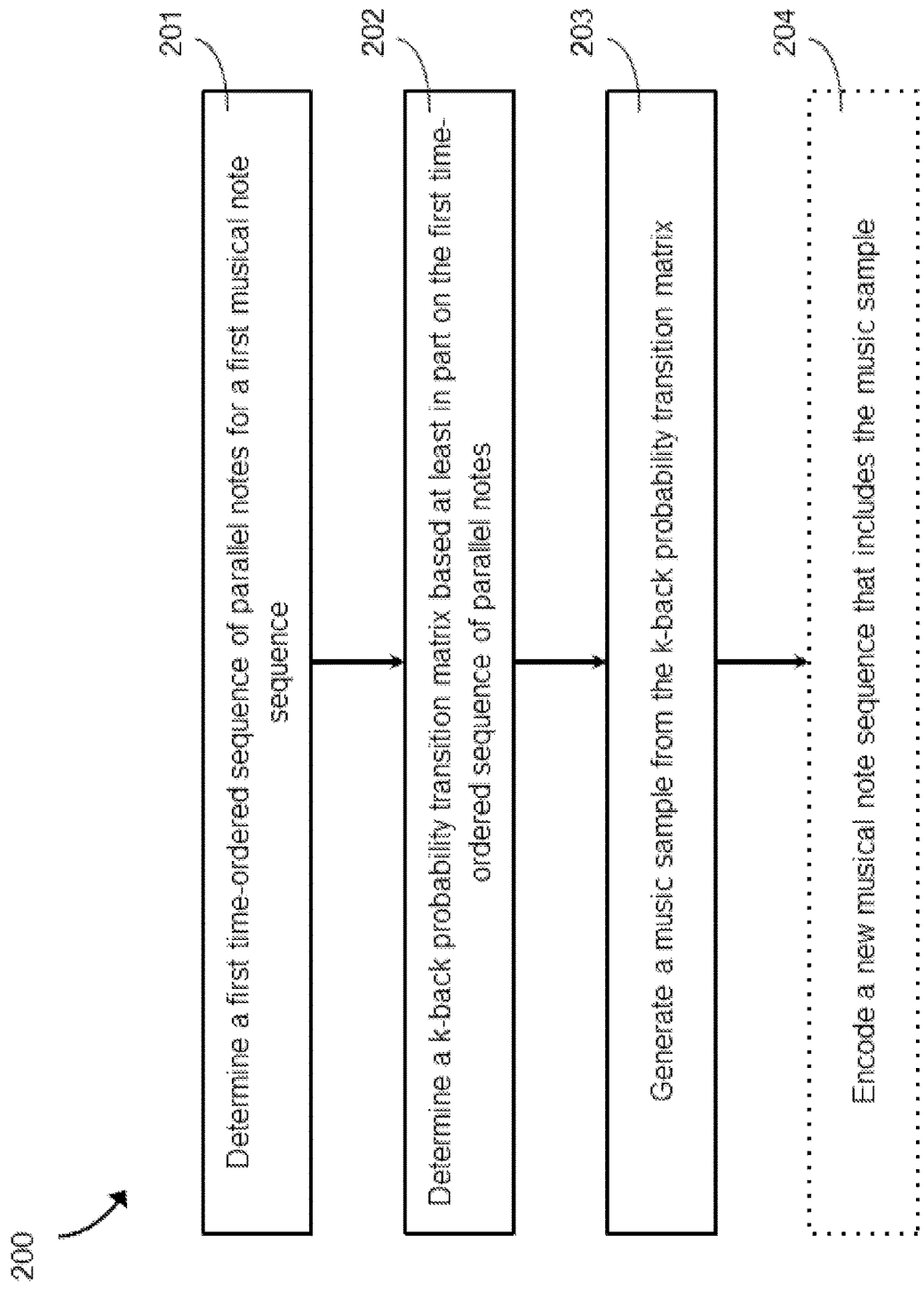
FIG. 2 is a flow diagram showing an exemplary computer-implemented method of generating a musical note sequence in accordance with the present systems, devices, and methods.
Figure 6:
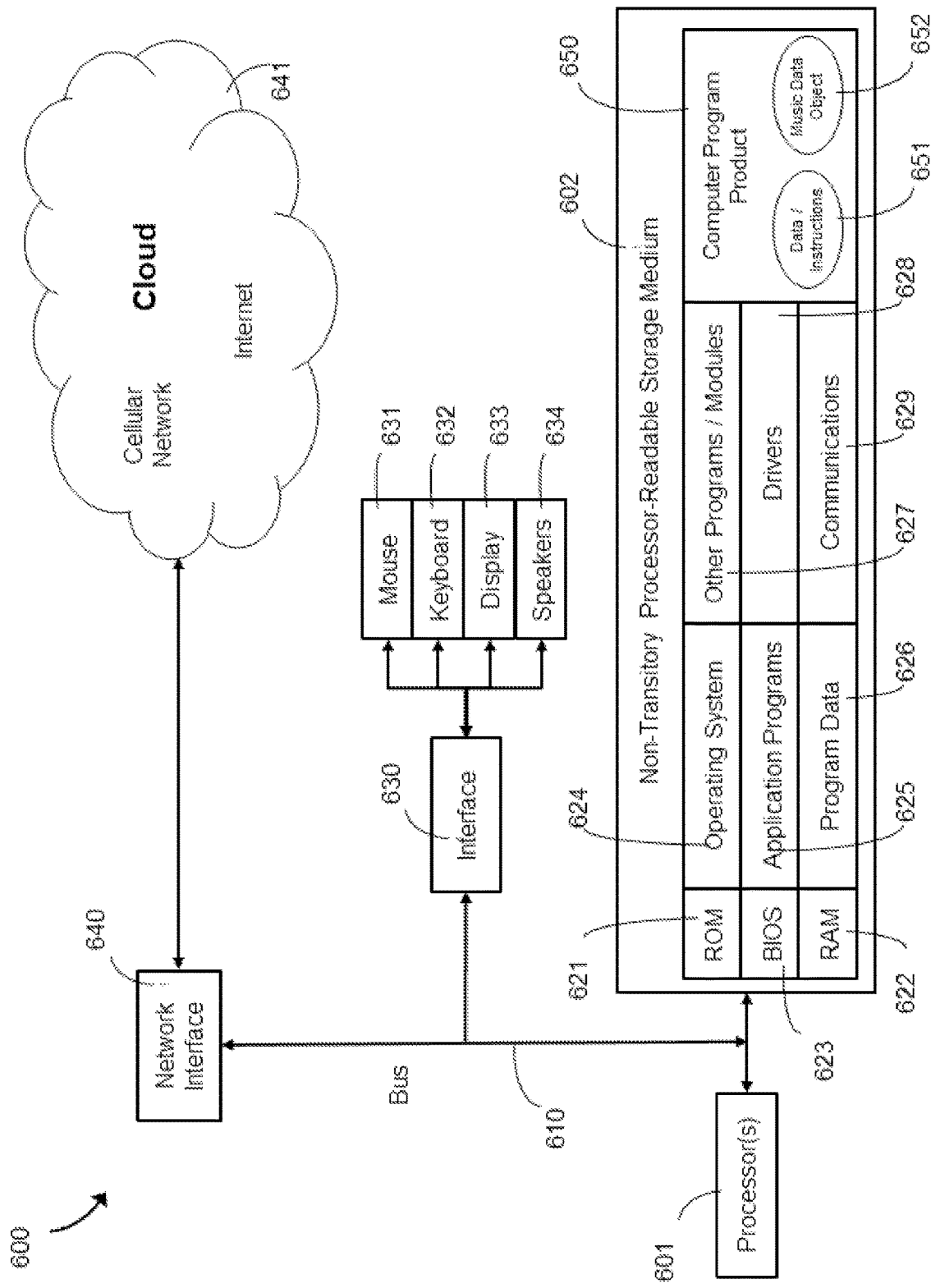
FIG. 6 is an illustrative diagram of a processor-based computer system suitable at a high level for performing the various computer-implemented methods described in the present systems, devices, and methods.

FIG. 2 is a flow diagram showing an exemplary computer-implemented method 200 of generating a musical note sequence in accordance with the present systems, devices, and methods. In general, throughout this specification and the appended claims, a computer-implemented method is a method in which the various acts are performed by one or more processor-based computer system(s). For example, certain acts of a computer-implemented method may be performed by at least one processor communicatively coupled to at least one non-transitory processor-readable storage medium or memory (hereinafter referred to as a non-transitory processor-readable storage medium) and, in some implementations, certain acts of a computer-implemented method may be performed by peripheral components of the computer system that are communicatively coupled to the at least one processor, such as interface devices, sensors, communications and networking hardware, and so on. The non-transitory processor-readable storage medium may store data and/or processor-executable instructions that, when executed by the at least one processor, cause the computer system to perform the method and/or cause the at least one processor to perform those acts of the method that are performed by the at least one processor. FIG. 6 and the written descriptions thereof provide illustrative examples of computer systems that are suitable to perform the computer-implemented methods described herein.

Returning to FIG. 2, method 200 includes three acts 201, 202, and 203, and one optional act 204, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 201, a first time-ordered sequence of parallel notes is determined (e.g., by at least one processor) for a first musical note sequence. Exemplary details of how the first time-ordered sequence of parallel notes may be determined are illustrated in FIG. 3.

Figure 3:
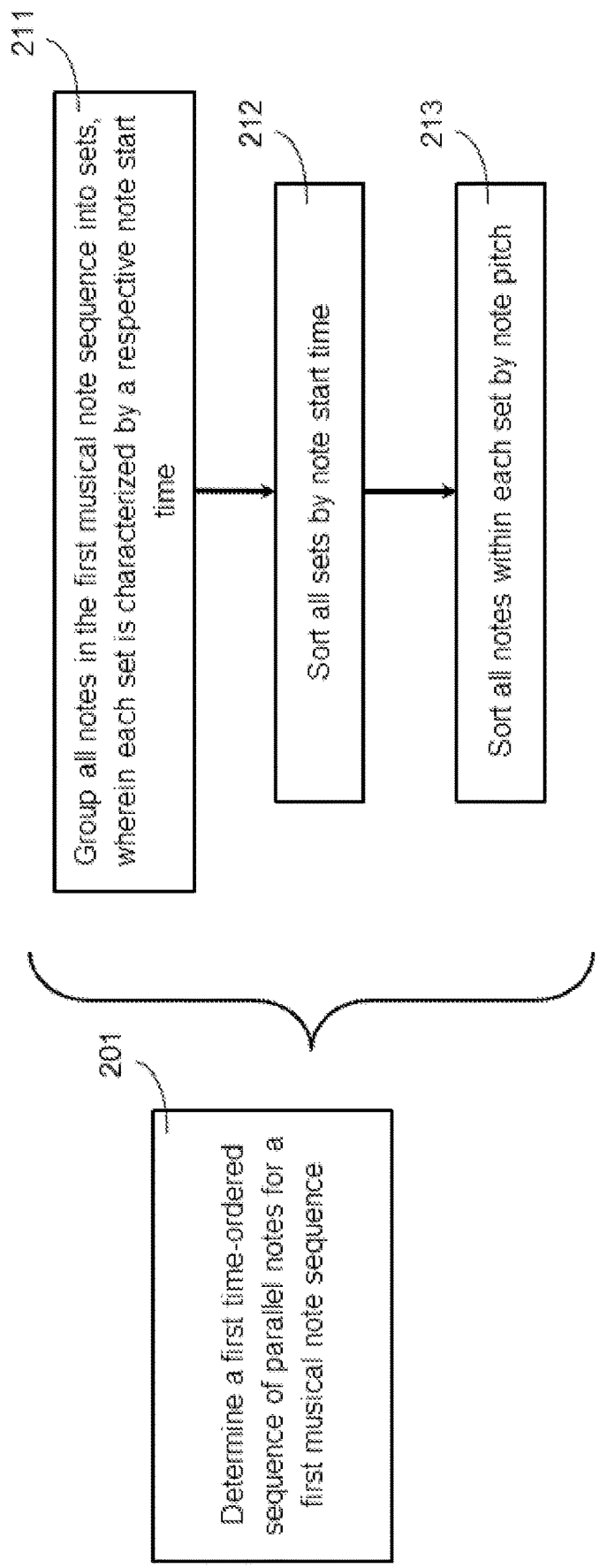
FIG. 3 is a flow diagram showing exemplary sub-acts that may be performed in order to determine the first time-ordered sequence of parallel notes for the first musical note sequence from the method of FIG. 2, in accordance with the present systems, devices, and methods.

FIG. 3 is a flow diagram showing exemplary sub-acts 211, 212, and 213 that may be performed in order to determine the first time-ordered sequence of parallel notes for a first musical note sequence at 201 of method 200. While FIG. 3 depicts three sub-acts 211, 212, and 213 for act 201 of method 200, those of skill in the art will appreciate that in alternative implementations certain sub-acts may be omitted and/or additional sub-acts may be added. Those of skill in the art will also appreciate that the illustrated order of the sub-acts is shown for exemplary purposes only and may change in alternative implementations.

At 211, all notes in the first musical note sequence are grouped into sets, where each set is characterized by a respective note start time. In other words, each set of temporally coincident notes in the first musical note sequence is grouped together. Throughout this specification and the appended claims, the term "parallel" is generally used to refer to a relationship of temporal coincidence; i.e., "parallel notes" may be temporally coincident notes in a musical composition or note sequence.

At 212, all of the sets established at 211 are sorted by note start time, e.g., from earliest note start time to latest note start time in the at least a portion of the at least a first musical composition.

At 213, all of the notes within each set established at 211 are sorted by note pitch, e.g., from lowest note to highest note.

A musical composition or note sequence may include percussion events that are used to impart rhythm and may not exhibit tonal pitch in the same way as other instruments. Throughout this specification and the appended claims, unless the specific context requires otherwise the term "note" is inclusive of percussion events. A percussion event may be defined or characterized by note parameters that may not include a pitch but may specify a percussion instrument as the instrument. In some implementations, notes corresponding to percussion events may include information related to "notional pitch". For example, there is a standard MIDI ordering of rhythm/percussion instruments that is based on assigning each rhythm/percussion instrument a respective MIDI number and corresponding notional tuning. Alternatively, notes corresponding to percussion events may include information related to "perceived pitch". For example, a human or artificial intelligence system may listen to or ingest the individual sounds of each percussion instrument in a set of percussion instruments and assign a respective perceived pitch number to each, starting with, for example, 1 as the lowest-sounding percussion instrument and progressing sequentially up to the highest-sounding instrument. Thus, in accordance with the present systems, devices, and methods sub-act 213 (namely, sorting all notes in a set of notes by note pitch) includes, where the set of notes includes percussion events, sorting all percussion events by notional pitch or perceived pitch depending on whether notional pitch or perceived pitch information is available for each percussion event.

Figure 4:
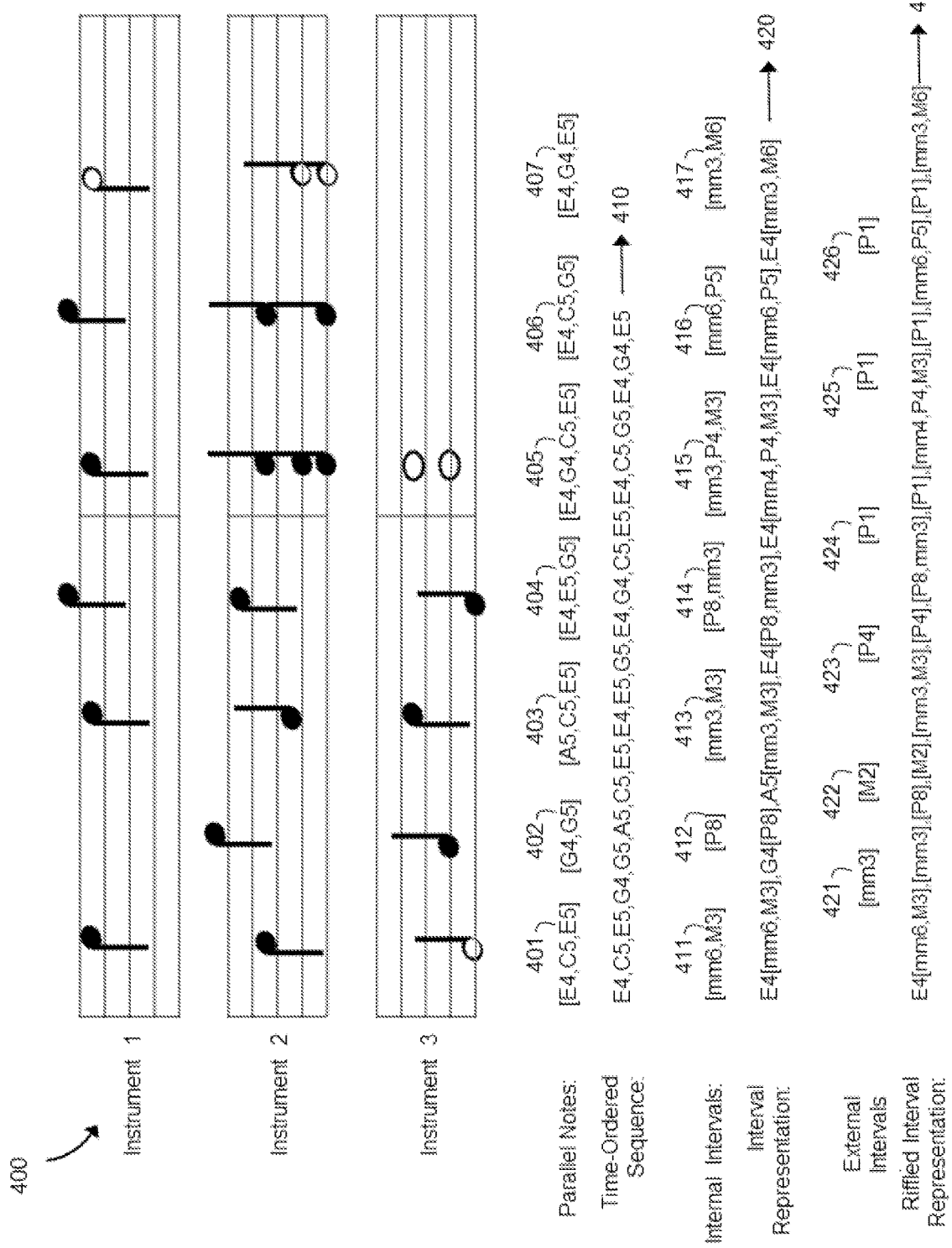
FIG. 4 is an illustrative diagram showing an exemplary portion of a musical composition in sheet music form, as well as its reduction to a time-ordered sequence of parallel notes in accordance with the present systems, devices, and methods.

An exemplary implementation of employing sub-acts 211, 212, and 213 to determine a time-ordered sequence of parallel notes is shown in FIG. 4.

FIG. 4 is an illustrative diagram showing an exemplary portion of a musical composition 400 in sheet music form, as well as its reduction to a time-ordered sequence of parallel notes 410 in accordance with the present systems, devices, and methods. The exemplary portion of musical composition 400 depicted in FIG. 4 includes three instruments (Instrument 1, Instrument 2, and Instrument 3), or tracks, and simple note sequences that are, for illustrative purposes, all in the key of C-major (the three staffs shown are all in treble clef). A person of skill in the art will appreciate that the present systems, devices, and methods may be implemented with musical compositions that employ any number of instruments spanning any combination of clefs, key signatures, tracks, note timings, scales, and so on.

FIG. 4 shows groupings or "sets" of parallel notes 401, 402, 403, 404, 405, 406, and 407 that have been established in accordance with an implementation of sub-act 211 of act 201 of method 200. Each of sets 401, 402, 403, 404, 405, 406, and 407 includes a respective group of notes from musical composition 400, where each group is characterized by a respective note start time. That is, set 401 consists of notes that start at a first start time in musical composition 400, set 402 consists of notes that start at a second start time in musical composition 400, and so on, up to set 407 that consists of notes that start at a seventh start time in musical composition 400. Per sub-act 212 of act 201 of method 200, sets 401, 402, 403, 404, 405, 406, and 407 are arranged in increasing order by note start time (i.e., with set 401 corresponding to the earliest note start time and set 407 corresponding to the latest note start time). Furthermore, per sub-act 213 of act 201 of method 200, each of sets 401, 402, 403, 404, 405, 406, and 407 is internally sorted by note pitch, with the lowest-pitch note in the set listed first up to the highest-pitch note in the set listed last. For example, set 403 is arranged in order from A5 to E5 and set 405 is arranged in order from E4 to E5. In the illustrated example of FIG. 4, only unique notes are included in each of sets 401, 402, 403, 404, 405, and 406. In particular, set 405 only includes the four notes [E4,G4,C5,E5] in the illustrated example even though six notes are actually temporally coincident at the start time corresponding to set 405. This is because the full set of six notes (i.e., [E4,G4,G4,C5,C5,E5]) includes two duplicate notes, namely, two instances of G4 and C5. In the illustrated example, only unique notes are listed but in alternative implementations all notes may be included in each set of parallel notes regardless of duplication and, in such implementations, set 405 would be [E4, G4,G4,C5,C5,E5].

With all of the time-ordered sets of parallel notes 401, 402, 403, 404, 405, 406, and 407 corresponding to portion of musical composition 400 established and sorted by note pitch, time-ordered sequence of parallel notes 410 is assembled by concatenating sets 401, 402, 403, 404, 405, 406, and 407 together in series. In the illustrated example of FIG. 4, time-ordered sequence of parallel notes 410 combines the notes from all three tracks (Instrument 1, Instrument 2, and Instrument 3) of musical composition 400 in parallel. In accordance with the present systems, devices, and methods, in other implementations a concatenated series of respective time-ordered sequences of parallel notes for each respective track in musical composition 400 may be constructed.

In accordance with the present systems, devices, and methods, the "parallel notes" in a time-ordered sequence of parallel notes may discard most or all information pertaining to their respective note parameters other than note pitch.

As previously described, in some implementations of the present systems, devices, and methods, the time-ordered sequence of parallel notes determined at 201 of method 200 may be used to determine an interval representation of the musical note sequence. As an example, an interval representation of the time-ordered sequence of parallel notes may be determined as follows: for each set of notes grouped together by note start time at 211, the lowest-pitch note in the set may be determined or identified and a respective internal interval may be determined or identified between each respective pair of adjacent notes in the set. An exemplary implementation of this process, resulting in the construction of an interval representation of a time-ordered sequence of parallel notes, is shown in FIG. 4.

FIG. 4 identifies the respective sets of internal intervals 411, 412, 413, 414, 415, 416, and 417 that correspond to each respective time-ordered set of parallel notes 401, 402, 403, 404, 405, 406, and 407. That is, set of internal intervals 411 characterizes the internal intervals corresponding to time-ordered set of parallel notes 401, set of internal intervals 412 characterizes the internal intervals corresponding to time-ordered set of parallel notes 402, and so on, up to set of internal intervals 417 characterizes the internal intervals corresponding to time-ordered set of parallel notes 407. In accordance with the present systems, devices, and methods, an interval representation 420 of time-ordered sequence of parallel notes 410 may be constructed by concatenating the set of internal intervals 411, 412, 413, 414, 415, 416, and 417 together in series and, in the concatenation, preceding each set of intervals with the lowest-pitch note in the corresponding time-ordered set of parallel notes.

As previously described, in some implementations of the present systems, devices, and methods, an interval representation 420 of a time-ordered sequence of parallel notes 410 may be used, at least in part, to generate a riffled interval representation 430 of a musical note sequence 400. In FIG. 4, riffled interval representation 430 employs respective external intervals 421, 422, 423, 424, 425, and 426 determined between each respective pair of lowest-pitch notes in adjacent time-ordered sets of parallel notes 401, 402, 403, 404, 405, 406, and 407. That is, external interval 421 corresponds to the interval between the lowest-pitch note in time-ordered set of parallel notes 401 and the lowest-pitch note in time-ordered set of parallel notes 402, external interval 422 corresponds to the interval between the lowest-pitch note in time-ordered set of parallel notes 402 and the lowest-pitch note in time-ordered set of parallel notes 403, and so on, up to external interval 426 corresponds to the interval between the lowest-pitch note in time-ordered set of parallel notes 406 and the lowest-pitch note in time-ordered set of parallel notes 407. In accordance with the present systems, devices, and methods, riffled interval representation 430 may be constructed inserting the corresponding external interval 421, 422, 423, 424, 425, and 426 in between respective adjacent pairs of sets of internal intervals 411, 412, 413, 414, 415, 416, and 417 in interval representation 420. In this way, riffled interval representation 430 alternates, for each set 401, 402, 403, 404, 405, 406, and 407, between representing all internal intervals within the set and representing an external interval between the set and a next adjacent set. In exemplary riffled interval representation 430 depicted in FIG. 4, the lowest-pitch note for each set of internal intervals 411, 412, 413, 414, 415, 416, and 417 is optionally omitted, except for the lowest-pitch note (E4) of the leading set 411.

Returning to FIG. 2, at 202 a k-back probability transition matrix is determined (e.g., by at least one processor) based at least in part on the first time-ordered sequence of parallel notes determined at 201. The k-back probability transition matrix characterizes, based on analysis of the time-ordered sequence of parallel notes from 201, the respective probability of a transition between each respective pair of notes in the time-ordered sequence of parallel notes from 201. For example, if an exemplary time-ordered sequence of notes determined at 201 consists of only three notes C, E, G and analysis of the time-ordered sequence of parallel notes at 202 determines the following:

For 50% of the instances of C, the next note is G;
For 50% of the instances of C, the next note is E;
For 100% of the instances of E, the next note is C;
For 10% of the instances of G, the next note is G;
For 20% of the instances of G, the next note is C; and
For 70% of the instances of G, the next note is E, then a k-back probability transition matrix for the above exemplary time-ordered sequence of parallel notes may be determined as:

$$\begin{array}{cccc} & C & E & G \\ C & 0 & 0.5 & 0.5 \\ E & 1 & 0 & 0 \\ G & 0.2 & 0.7 & 0.1 \end{array}$$

The above is an illustrative example of a "1-back" probability transition matrix; i.e., a k-back probability transition matrix for which, for each note, the analysis only considers the note that immediately precedes that note in the time-ordered sequence of parallel notes and not any note(s) that precede the preceding note, and therefore a k-back probability transition matrix having a k-value of 1. In different implementations of the present systems, devices, and methods, different k-values may be implemented. For example, k may equal 1, 2, 3, 4, 5, or so on. However, as described previously, it can be advantageous not to employ too large a value for k, otherwise new note sequences generated based on the k-back probability transition matrix (see act 203) might become too similar to the original note sequence(s) represented in the time-ordered sequence of parallel notes from 201. Generally, in some implementations it can be advantageous to choose k such that $1 \le k < J$, where J is a smallest integer for which every sequence of k parallel notes in the first time-ordered sequence of parallel notes is unique.

A person of skill in the art will appreciate that the above example of a k-back probability transition matrix is highly simplified for the purpose of illustration. In practice, implementations of the present systems, devices, and methods may employ k-back probability transition matrices that are considerably more complicated and for which their determination by a computer system is highly advantageous. For example, a time-ordered sequence of parallel notes may include considerably more than the three notes used in the example above (such as 20 notes, 50 notes, 80 notes, etc.)

and a k-back probability transition matrix for k>1 may capture relationship such as: "when the note that precedes G is C# and the note that precedes C# is F, then 13% of the time the next note is A", which necessitates a considerably larger and more complicated matrix in order to capture the probabilities for all possible note sequences.

In accordance with the present systems, devices, and methods, determining a k-back probability transition matrix based at least in part on a time-ordered sequence of parallel notes at 202 may include determining a k-back probability transition matrix based at least in part on an interval representation of a time-ordered sequence of parallel notes and/or based at least in part on a riffled interval representation of the time-ordered sequence of parallel notes. In either case, the k-back probability transition matrix may characterize interval transitions as opposed to note transitions. More generally, determining a k-back probability transition matrix based at least in part on the first time-ordered sequence of parallel notes at 202 may include determining a k-back probability transition matrix based at least in part on at least one of: note sequences, note interval sequences, time interval sequences, note start-time sequences, and/or time duration sequences.

As previously described, in some implementations it can be advantageous to structure the k-back probability transition matrix as a Markov (i.e., k=1) process but where the elements themselves are grouped into sets or "tuples" in order to provide some "look-back" information. For example, for the following sequence of notes:

A,B,C,D,E,F,G a non-Markovian k-back probability transition matrix with k=3 will characterize the probabilities for each note based on the up to 3 notes that precede it (e.g., characterize the probabilities of transitions to the E based on the D, C, and B that precede it), whereas a Markovian probability transition matrix employing k-tuples (or "tuples of size k") with k=3 will characterize the following sequence of tuples with each tuple only based on the one tuple that immediately precedes it:

[A,B,C],[B,C,D],[C,D,E],[D,E,F],[E,F,G]

Thus, in some implementations of the present systems, devices, and methods, determining a k-back probability transition matrix at 202 based at least in part on a time-ordered sequence of parallel notes from 201 may include: i) grouping the time-ordered sequence of parallel notes into a sequence of tuples each having size k; and ii) determining a probability transition matrix based at least in part on the tuples, where a probability of each successor tuple depends on an immediately previous tuple and not on any additional tuple that precedes the immediately previous tuple.

Returning to FIG. 2, at 203 a music sample is generated (e.g., by at least one processor) from the k-back probability transition matrix determined at 202. The music sample may include a new note sequence (i.e., a second musical note sequence) that may be less than, equal to, are greater than the length of the time-ordered sequence of parallel notes determined at 201 (and/or less than, equal to, or greater than the original first musical note sequence). For example, the music sample may include a second time-ordered sequence of parallel notes based at least in part on the first time-ordered sequence of parallel notes determined at 201. In such cases, generating the music sample at 203 may include converting the second time-ordered sequence of parallel notes may by (re-)applying note parameters to the parallel notes in the second time-ordered sequence of parallel notes. The note parameters (re-) applied to the second time-ordered sequence of parallel notes may include any or all of: note parameters copied from the first musical note sequence (e.g., on a one:one note correspondence basis, or otherwise), note parameters copied from a separate, third musical note sequence (e.g., taken from a different musical composition), and/or newly generated note parameters. In some implementations, the second musical note sequence, and/or the note parameters (re-)applied to the parallel notes in the second time-ordered sequence of parallel notes, may advantageously preserve at least one attribute from the first musical note sequence, such as, without limitation: a number of notes, a volume, a note sequence duration, a note duration, a tempo, a distribution of note accents, a note timing, a beat, an instrument, and/or a timbre. As previously described, in some implementations a one-to-one correspondence may be established between notes in the first time-ordered sequence of parallel notes determined at 201 and notes in the music sample or second time-ordered sequence of parallel notes determined at 203.

In some implementations, note parameters from a musical note sequence other than the first musical note sequence may be applied to the second time-ordered sequence of parallel notes to generate the second musical note sequence. In other implementations, new note parameters may be generated and applied to the second time-ordered sequence of parallel notes to generate the second musical note sequence.

In some implementations, method 200 may end at 203 and not proceed to optional act 204. However, in other implementations method 200 may include optional act 204. At 204, a new musical note sequence that includes the music sample generated at 203 is encoded, e.g., by at least one processor into a data object or digital music file stored in a non-transitory processor-readable storage medium communicatively coupled to the at least one processor. The new musical note sequence may be invoked, used, or applied in a musical composition generated, for example, automatically by the computer system. Depending on the specific implementation, the new musical note sequence may be sufficiently distinct from the first musical note sequence from which the time-ordered sequence of parallel notes and k-back probability transition matrix were determined at 201 and 202, respectively, such that the new musical note sequence is considered an original musical note sequence, or the new musical note sequence may be sufficiently similar to the first musical note sequence from which the time-ordered sequence of parallel notes and k-back probability transition matrix were determined at 201 and 202, respectively, such that the new musical note sequence is considered a variation of the first musical note sequence. In the latter case, the variation may be encoded with the music sample in place of the at least a portion of the first musical note sequence from which the time-ordered sequence of parallel notes and k-back probability transition matrix were determined at 201 and 202, respectively. If the first musical note sequence corresponds to a particular track or instrument, then when applied in a new musical composition the new musical note sequence may be used or assigned to the same instrument or a different instrument depending on the implementation.

In various implementations of the present systems, devices, and methods, the "first musical note sequence" for which the time-ordered sequence of parallel notes is determined at 201 may include a single musical note sequence or a plurality of musical note sequences. For example, an implementation of method 200 may be applied to two musical note sequences such that the implementation of method 200 further includes determining (e.g., by at least one processor) a second time-ordered sequence of parallel notes for a second musical note sequence. In this case, determining a k-back probability transition matrix based at least in part on the first time-ordered sequence of parallel notes at 202 may include determining a k-back probability transition matrix based at least in part on both the first time-ordered sequence of parallel notes and the second time-ordered sequence of parallel notes.

In some implementations of the present systems, devices, and methods, the "first musical note sequence" for which the time-ordered sequence of parallel notes is determined at 201 may include a set of musical note sequences each having a common characteristic, such as: originating from (e.g., being respective tracks of) a common musical composition, embodying a common genre, embodying a common style, embodying a common mood, featuring a common instrument, originating from a common composer, originating from a common performing artist, originating from a common band, originating from a common album, originating from a common producer, originating from a common studio, and/or functioning in a common musical role (e.g., in the case where the musical note sequence corresponds to a track from a musical composition, "musical role" may refer to whether the track is functions as a melody, bassline, ornamentation, or the like). An illustrative example of how method 200 may be adapted to accommodate a set of musical compositions is provided in FIG. 5.

Figure 5:
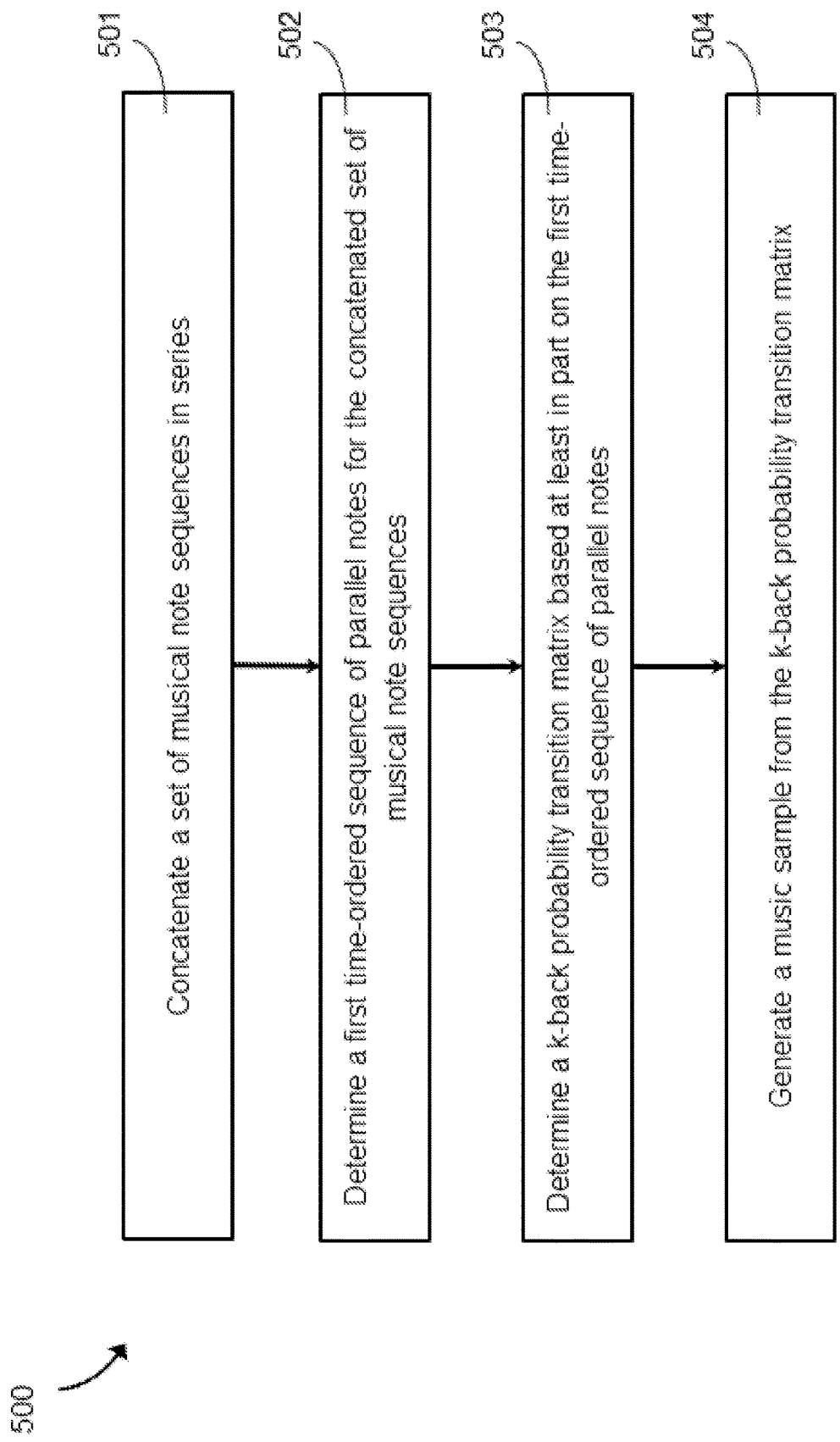
FIG. 5 is a flow diagram showing an exemplary computer-implemented method of generating a musical note sequence in accordance with the present systems, devices, and methods.

FIG. 5 is a flow diagram showing an exemplary computer-implemented method 500 of generating a musical note sequence in accordance with the present systems, devices, and methods. Method 500 includes four acts 501, 502, 503, and 504, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 501, a set of musical note sequences is concatenated in series, e.g., by at least one processor. For example, data objects and or digital music files representing the set of musical note sequences and stored in a non-transitory processor-readable storage medium may be manipulated by at least one processor communicatively coupled to the non-transitory processor-readable storage medium in order to generate a continuous or contiguous string of musical notes sequences effectively serving as a single musical note sequence. As previously described, the set of musical note sequences may advantageously share a common attribute that is to be maintained in the musical note sequence(s) generated by method 500. For example, if the set of musical note sequences are all written and performed by the same musical band or artist, then the musical note sequence(s) generated by method 500 may exhibit qualities that resemble the music written and performed by such musical band or artist such that the musical note sequence(s) generated by method 500 may "sound like" they were written and performed by such musical band or artist.

As described above, the concatenated set of musical note sequences may advantageously consist of note sequences that are selected in a deliberate way. For example, each note sequence in the concatenated set of note sequences may correspond to, without limitation: a respective track of a single multi-track musical composition, considered in series; a respective track of a single multi-track musical composition, considered in unison; respective tracks from different multi-track musical compositions, considered in series; respective tracks from different multi-track musical compositions, considered in unison; respective segments of a single track; and/or respective note sequences that share another common characteristic as described above.

At 502, a first time-ordered sequence of parallel notes is determined, e.g., by the at least one processor, for the concatenated set of musical note sequences. Act 502 may be substantially similar to act 201 from method 200 where the "first musical note sequence" at 201 of method 200 includes the concatenated set of musical note sequences.

At 503, a k-back probability transition matrix is determined, e.g., by the at least one processor, based at least in part on the first time-ordered sequence of parallel notes determined at 502. Act 503 may be substantially similar to act 202 of method 200 where the first time-ordered sequence of parallel notes provides a representation of the concatenated set of musical note sequences. However, in some implementations accommodations may advantageously be put in place for the transitions that occur between each pair of successive musical note sequences in the concatenated set of musical note sequences. For example, in the concatenated set of musical note sequences, each transition from a first musical note sequence to a second musical note sequence may reflect a note transition or external interval that is not typically included within the musical note sequences themselves, because such transition is not actually a part of the musical note sequences. In accordance with the present systems, devices, and methods, the respective transition between each pair of successive musical note sequences in a concatenated set of musical note sequences may be characterized in a prescribed way, such as: the transition may be ignored or discarded, the probability of such transition may be set to zero, or any arbitrary convention for characterizing such a transition may be adopted and implemented. Similarly, when interval representations are employed, the interval between successive musical note sequences in a concatenated set of musical note sequences may be defined in a prescribed way according to a convention, such as: the interval between adjacent musical note sequences is 0.

In some implementations of the present systems, devices, and methods, a musical note sequence created, composed, or generated by a computer system may include lyrics and human vocals. Lyrics may be generated by the computer system using a lyrics composition engine or algorithm that may employ, for example, one or more trained classifier(s) and machine learning techniques. Alternatively, lyrics may be composed by a human, such as by the user of the computer system. Vocals may be generated by the computer system, for example, as notes for which the corresponding "instrument" note parameter is "vocals." For example, synthesized vocals may be used. Alternatively, vocals may be provided by a human vocalist either before or after the musical note sequence is produced by the computer system. Thus, in some implementations the various systems, devices, and methods for computer-generated musical note sequences described herein may produce one or more musical note sequence(s) that do not include lyrics and/or vocals. In such implementations, the lyrics and/or human vocals may either: a) be provided (e.g., by a human vocalist) in advance of generating the musical note sequence by the computer system, in which case the musical note sequence generated by the computer system may advantageously account for, accommodate, or otherwise be based upon the lyrics and/or human vocals (e.g., the computer system may analyze and learn various musical and/or harmonic features form the human vocals and incorporate such learning into the generation of the musical note sequence); or b) be provided (e.g., by a human vocalist) after the musical note sequence has been generated by the computer system, in which case the human vocalist may compose the lyrics and/or vocals to account for, accommodate, or otherwise be based upon the non-vocal elements of the musical note sequence generated by the computer system.

The various implementations described herein improve the functioning of computer systems for the specific practical application of computer-based music composition, including but not limited to automated or algorithmic composition of music. For example, the algorithmic music sample generation (e.g., 103, 203, 504) based on k-back probability transition matrices that characterize note transition probabilities in libraries of existing music can advantageously generate new musical note sequences, which can be further developed into new musical compositions, in greater volume, with greater rapidity, and with greater association to the source material than other computer-based approaches to music composition available today. Overall, the present systems, devices, and methods can improve the functioning of a computer-based music composition system by implementing computationally-intensive k-back probability transition matrices to capture/encode a "style" of the musical note sequence(s) being analyzed and to apply that style in any number of new, automatically generated musical note sequences.

The various implementations described herein often make reference to "computer-based," "computer-implemented," "at least one processor," "a non-transitory processor-readable storage medium," and similar computer-oriented terms. A person of skill in the art will appreciate that the present systems, devices, and methods may be implemented using or in association with a wide range of different hardware configurations, including localized hardware configurations (e.g., a desktop computer, laptop, smartphone, or similar) and/or distributed hardware configurations that employ hardware resources located remotely relative to one another and communicatively coupled through a network, such as a cellular network or the internet. For the purpose of illustration, exemplary computer systems suitable for implementing the present systems, devices, and methods are provided in FIG. 6.

FIG. 6 is an illustrative diagram of a processor-based computer system 600 suitable at a high level for performing the various computer-implemented methods described in the present systems, devices, and methods. Although not required, some portion of the implementations are described herein in the general context of data, processor-executable instructions or logic, such as program application modules, objects, or macros executed by one or more processors. Those skilled in the art will appreciate that the described implementations, as well as other implementations, can be practiced with various processor-based system configurations, including handheld devices, such as smartphones and tablet computers, multiprocessor systems, microprocessor-based or programmable consumer electronics, personal computers ("PCs"), network PCs, minicomputers, mainframe computers, and the like.

Processor-based computer system 600 includes at least one processor 601, a non-transitory processor-readable storage medium or "system memory" 602, and a system bus 610 that communicatively couples various system components including the system memory 602 to the processor(s) 601. Processor-based computer system 601 is at times referred to in the singular herein, but this is not intended to limit the implementations to a single system, since in certain implementations there will be more than one system or other networked computing device(s) involved. Non-limiting examples of commercially available processors include, but are not limited to: Core microprocessors from Intel Corporation, U.S.A., PowerPC microprocessor from IBM, ARM processors from a variety of manufacturers, Sparc microprocessors from Sun Microsystems, Inc., PA-RISC series microprocessors from Hewlett-Packard Company, and 68xxx series microprocessors from Motorola Corporation.

The processor(s) 601 of processor-based computer system 600 may be any logic processing unit, such as one or more central processing units (CPUs), microprocessors, digital signal processors (DSPs), application-specific integrated circuits (ASICs), field programmable gate arrays (FPGAs), and/or the like. Unless described otherwise, the construction and operation of the various blocks shown in FIG. 6 may be presumed to be of conventional design. As a result, such blocks need not be described in further detail herein as they will be understood by those skilled in the relevant art.

The system bus 610 in the processor-based computer system 600 may employ any known bus structures or architectures, including a memory bus with memory controller, a peripheral bus, and/or a local bus. The system memory 602 includes read-only memory ("ROM") 621 and random access memory ("RAM") 622. A basic input/output system ("BIOS") 623, which may or may not form part of the ROM 621, may contain basic routines that help transfer information between elements within processor-based computer system 600, such as during start-up. Some implementations may employ separate buses for data, instructions and power.

Processor-based computer system 600 (e.g., system memory 602 thereof) may include one or more solid state memories, for instance, a Flash memory or solid state drive (SSD), which provides nonvolatile storage of processor-executable instructions, data structures, program modules and other data for processor-based computer system 600. Although not illustrated in FIG. 6, processor-based computer system 600 may, in alternative implementations, employ other non-transitory computer- or processor-readable storage media, for example, a hard disk drive, an optical disk drive, or a memory card media drive.

Program modules in processor-based computer system 600 may be stored in system memory 602, such as an operating system 624, one or more application programs 625, program data 626, other programs or modules 627, and drivers 628.

The system memory 602 in processor-based computer system 600 may also include one or more communications program(s) 629, for example, a server and/or a Web client or browser for permitting processor-based computer system 600 to access and exchange data with other systems such as user computing systems, Web sites on the Internet, corporate intranets, or other networks as described below. The communications program(s) 629 in the depicted implementation may be markup language based, such as Hypertext Markup Language (HTML), Extensible Markup Language (XML) or Wireless Markup Language (WML), and may operate with markup languages that use syntactically delimited characters added to the data of a document to represent the structure of the document. A number of servers and/or Web clients or browsers are commercially available such as those from Google (Chrome), Mozilla (Firefox), Apple (Safari), and Microsoft (Internet Explorer).

While shown in FIG. 6 as being stored locally in system memory 602, operating system 624, application programs 625, program data 626, other programs/modules 627, drivers 628, and communication program(s) 629 may be stored and accessed remotely through a communication network or stored on any other of a large variety of non-transitory processor-readable media (e.g., hard disk drive, optical disk drive, SSD and/or flash memory).

Processor-based computer system 600 may include one or more interface(s) to enable and provide interactions with a user, peripheral device(s), and/or one or more additional processor-based computer system(s). As an example, processor-based computer system 610 includes interface 630 to enable and provide interactions with a user of processor-based computer system 600. A user of processor-based computer system 600 may enter commands, instructions, data, and/or information via, for example, input devices such as computer mouse 631 and keyboard 632. Other input devices may include a microphone, joystick, touch screen, game pad, tablet, scanner, biometric scanning device, wearable input device, and the like. These and other input devices (i.e., "I/O devices") are communicatively coupled to processor(s) 601 through interface 630, which may include one or more universal serial bus ("USB") interface(s) that communicatively couples user input to the system bus 610, although other interfaces such as a parallel port, a game port or a wireless interface or a serial port may be used. A user of processor-based computer system 600 may also receive information output by processor-based computer system 600 through interface 630, such as visual information displayed by a display 633 and/or audio information output by one or more speaker(s) 634. Monitor 633 may, in some implementations, include a touch screen.

As another example of an interface, processor-based computer system 600 includes network interface 640 to enable processor-based computer system 600 to operate in a networked environment using one or more of the logical connections to communicate with one or more remote computers, servers and/or devices (collectively, the "Cloud" 641) via one or more communications channels. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, network interface 640 may include one or more wired or wireless communications interfaces, such as network interface controllers, cellular radios, WI-FI radios, and/or Bluetooth radios for establishing communications with the Cloud 641, for instance, the Internet or a cellular network.

In a networked environment, program modules, application programs or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, processor(s) 601, system memory 602, interface 630, and network interface 640 are illustrated as communicatively coupled to each other via the system bus 610, thereby providing connectivity between the above-described components. In alternative implementations, the above-described components may be communicatively coupled in a different manner than illustrated in FIG. 6. For example, one or more of the above-described components may be directly coupled to other components, or may be coupled to each other via intermediary components (not shown). In some implementations, system bus 610 may be omitted with the components all coupled directly to each other using suitable connections.

In accordance with the present systems, devices, and methods, processor-based computer system 600 may be used to implement or in association with any or all of methods 100, 200, and/or 500 described herein and/or to define, encode, and/or manipulate any or all of the data objects, note sequences, and/or probability transition matrices described herein. Where the descriptions of methods 100, 200, and 500 make reference to an act being performed by at least one processor, such act may be performed by processor(s) 601 of computer system 600. Where the descriptions of methods 100, 200, and 500 make reference an act being performed by, performed on, or otherwise involving a non-transitory processor-readable storage medium, such act may be performed by, performed on, or otherwise involve system memory 602 of computer system 600.

Computer system 600 is an illustrative example of a system for performing all or portions of the various methods described herein, the system comprising at least one processor 601, at least one non-transitory processor-readable storage medium 602 communicatively coupled to the at least one processor 601 (e.g., by system bus 610), and the various other hardware and software components illustrated in FIG. 6 (e.g., operating system 624, mouse 631, etc.). In particular, in order to enable system 600 to implement the present systems, devices, and methods, system memory 602 stores a computer program product 650 comprising processor-executable instructions and/or data 651 that, when executed by processor(s) 601, cause processor(s) 601 to perform the various processor-based acts of methods 100, 200, and/or 500 as described herein. In the illustrated implementation of computer system 600, system memory 602 also stores at least one music data object 652 which is accessed by computer program product 650.

Throughout this specification and the appended claims, the term "computer program product" is used to refer to a package, combination, or collection of software comprising processor-executable instructions and/or data that may be accessed by (e.g., through a network such as cloud 641) or distributed to and installed on (e.g., stored in a local non-transitory processor-readable storage medium such as system memory 602) a computer system (e.g., computer system 600) in order to enable certain functionality (e.g., application(s), program(s), and/or module(s)) to be executed, performed, or carried out by the computer system.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, reference is often made to a "track." Unless the specific context requires otherwise, the term track is used herein to refer to a collection or sequence of notes that are all "played by" the same instrument in a musical composition. For example, a musical composition that is for or by a single instrument may have only one track, but a musical composition that is for or by multiple instruments concurrently may have multiple tracks that are temporally overlaid on one another. Each respective bar of a musical composition may include multiple tracks, where each track provides the sequence of notes of a respective instrument throughout the duration of that bar.

Throughout this specification and the appended claims, unless the specific context requires otherwise the term "bar" is generally used to refer to a musical bar; i.e., a portion of time comprising a set number of beats from a musical composition. The number of beats in a bar depends on the time signature for the musical composition. A person of skill in the art will appreciate that the "parameters" of a bar, or "bar parameters," may include any or all concepts used to characterize bars in modern musical theory, including without limitation: bar index, time signature, beats per minute, duration, start time, stop time, beat times, key, scale, chords, tracks, sequence of notes, and (if applicable) sequence of percussion events.

Throughout this specification and the appended claims, the term "first" and related similar terms, such as "second," "third," and the like, are often used to identify or distinguish one element or object from other elements or objects (as in, for example, "first note" and "first bar"). Unless the specific context requires otherwise, such uses of the term "first," and related similar terms such as "second," "third," and the like, should be construed only as distinguishing identifiers and not construed as indicating any particular order, sequence, chronology, or priority for the corresponding element(s) or object(s). For example, unless the specific context requires otherwise, the term "first note" simply refers to one particular note among other notes and does not necessarily require that such one particular note be positioned ahead of or before any other note in a sequence of notes; thus, a "first note" of a musical composition or bar is one particular note from the musical composition or bar and not necessarily the lead or chronologically-first note of the musical composition or bar.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A computer-implemented method of generating a musical note sequence, the method comprising:
   determining a first time-ordered sequence of parallel notes for a first musical note sequence;
   determining a k-back probability transition matrix based at least in part on the first time-ordered sequence of parallel notes, wherein determining the k-back probability transition matrix based at least in part on the first time-ordered sequence of parallel notes includes:
   grouping the first time-ordered sequence of parallel notes into a sequence of tuples each having size k; and
   determining a probability transition matrix based at least in part on the tuples, wherein a probability of each successor tuple depends on an immediately previous tuple and not on any additional tuple that precedes the immediately previous tuple;
   and
   generating a music sample from the k-back probability transition matrix.

2. The method of claim 1 wherein generating a music sample from the k-back probability transition matrix includes generating a second time-ordered sequence of parallel notes based at least in part on the first time-ordered sequence of parallel notes.

3. The method of claim 2 wherein generating a music sample from the k-back probability transition matrix further includes converting the second time-ordered sequence of parallel notes into a second musical note sequence, and wherein converting the second time-ordered sequence of parallel notes into a second musical note sequence includes applying note parameters to each respective note in the second time-ordered sequence of parallel notes, the note parameters selected from a group consisting of: note parameters copied from the first musical note sequence, note parameters copied from a third musical note sequence, and newly generated note parameters.

4. The method of claim 1, further comprising:
generating a new musical note sequence that includes the music sample.

5. The method of claim 4 wherein generating the new musical note sequence that includes the music sample includes generating a variation of the first musical note sequence with the music sample in place of the first musical note sequence.

6. The method of claim 1 wherein determining a first time-ordered sequence of parallel notes for a first musical note sequence includes:
grouping all notes in the first musical note sequence into sets, wherein each set is characterized by a respective note start time;
sorting all sets by note start time; and
sorting all notes within each set by note pitch.

7. The method of claim 6, further comprising:
determining an interval representation of the first time-ordered sequence of parallel notes, wherein determining an interval representation of the first time-ordered sequence of parallel notes includes:
for each set:
determining a lowest-pitch note in the set; and
determining a respective internal interval between each respective pair of adjacent notes in the set;
and wherein determining a k-back probability transition matrix based at least in part on the first time-ordered sequence of parallel notes includes determining a k-back probability transition matrix based at least in part on the interval representation of the first time-ordered sequence of parallel notes.

8. The method of claim 7, further comprising:
determining a respective external interval between each respective pair of lowest-pitch notes in adjacent sets; and
determining a riffled interval representation of the first time-ordered sequence of parallel notes that, for each set, alternates between representing all internal intervals within the set and representing an external interval between the set and a next adjacent set, and wherein determining a k-back probability transition matrix based at least in part on the interval representation of the first time-ordered sequence of parallel notes includes determining a k-back probability transition matrix based at least in part on the riffled interval representation of the first time-ordered sequence of parallel notes.

9. The method of claim 1 wherein $1 \leq k < J$, where J is a smallest integer for which every sequence of k parallel notes in the first time-ordered sequence of parallel notes is unique.

10. The method of claim 1, further comprising:
establishing a one-to-one correspondence between notes in the first musical note sequence and notes in the music sample generated from the k-back probability transition matrix.

11. The method of claim 1 wherein determining a k-back probability transition matrix based at least in part on the first time-ordered sequence of parallel notes includes determining the k-back probability transition matrix based at least in part on at least one of: note sequences, note interval sequences, note start-time sequences, time interval sequences, and/or time duration sequences.

12. The method of claim 1, further comprising:
determining a second time-ordered sequence of parallel notes for a second musical note sequence, wherein determining a k-back probability transition matrix based at least in part on the first time-ordered sequence of parallel notes includes determining the k-back probability transition matrix based at least in part on both the first time-ordered sequence of parallel notes and the second time-ordered sequence of parallel notes.

13. The method of claim 1, further comprising:
concatenating a set of musical note sequences in series, wherein determining a first time-ordered sequence of parallel notes for a first musical note sequence includes determining the first time-ordered sequence of parallel notes for the concatenated set of musical note sequences.

14. The method of claim 13 wherein determining a k-back probability transition matrix based at least in part on the first time-ordered sequence of parallel notes includes, for each pair of successive musical note sequences in the concatenated set of musical note sequences, characterizing a transition between the pair of successive musical note sequences in a prescribed way.

15. The method of claim 13 wherein the set of musical note sequences consists of a plurality of musical note sequences each having a common characteristic selected from a group consisting of: originating from a common musical composition, being respective tracks of a common multi-track musical composition, embodying a common genre, embodying a common style, embodying a common mood, featuring a common instrument, originating from a common composer, originating from a common performing artist, originating from a common band, originating from a common album, originating from a common producer, originating from a common studio, and/or functioning in a common musical role.

16. A system for generating a musical note sequence, the system comprising:
at least one processor; and
a non-transitory processor-readable storage medium communicatively coupled to the at least one processor, the non-transitory processor-readable storage medium storing processor-executable instructions and/or data that, when executed by the at least one processor, cause the at least one processor to:
determine a first time-ordered sequence of parallel notes for a first musical note sequence;
determine a k-back probability transition matrix based at least in part on the first time-ordered sequence of parallel notes, wherein the processor-executable instructions and/or data that, when executed by the at least one processor, cause the at least one processor to determine a k-back probability transition matrix based at least in part on the first time-ordered sequence of parallel notes, cause the at least one processor to:

group the first time-ordered sequence of parallel notes into a sequence of tuples each having size k; and determine a probability transition matrix based at least in part on the tuples, wherein a probability of each successor tuple depends on an immediately previous tuple and not on any additional tuple that precedes the immediately previous tuple;

and generate a music sample from the k-back probability transition matrix.

17. The system of claim 16, further comprising:

processor-executable instructions and/or data that, when executed by the at least one processor, cause the at least one processor to generate a new musical note sequence that includes the music sample.

18. A computer program product for generating a musical note sequence, the computer program product comprising:

processor-executable instructions and/or data that, when the computer program product is stored in a non-transitory processor-readable storage medium and executed by at least one processor communicatively coupled to the non-transitory processor-readable storage medium, cause the at least one processor to:

determine a first time-ordered sequence of parallel notes for a first musical note sequence;

determine a k-back probability transition matrix based at least in part on the first time-ordered sequence of parallel notes, wherein the processor-executable instructions and/or data that, when executed by the at least one processor, cause the at least one processor to determine a k-back probability transition matrix based at least in part on the first time-ordered sequence of parallel notes, cause the at least one processor to:

group the first time-ordered sequence of parallel notes into a sequence of tuples each having size k; and determine a probability transition matrix based at least in part on the tuples, wherein a probability of each successor tuple depends on an immediately previous tuple and not on any additional tuple that precedes the immediately previous tuple;

and generate a music sample from the k-back probability transition matrix.

19. The computer program product of claim 18, further comprising:

processor-executable instructions and/or data that, when executed by the at least one processor, cause the at least one processor to generate a new musical note sequence that includes the music sample.

* * * * *